US012621424B2

(12) United States Patent  
Park et al.

(10) Patent No.: US 12,621,424 B2  
(45) Date of Patent: May 5, 2026

(54) ELECTRONIC APPARATUS AND CONTROL METHOD THEREOF

(71) Applicants: Samsung Electronics Co., Ltd., Suwon-si (KR); Korea University Research and Business Foundation, Seoul (KR)

(72) Inventors: Seungho Park, Suwon-si (KR); Changsu Kim, Seoul (KR); Keunsoo Ko, Seoul (KR); Daesung Cho, Suwon-si (KR); Youngsu Moon, Suwon-si (KR); Jinyoung Jun, Seoul (KR); Seunggyun Woo, Seoul (KR); Younghoon Jeong, Suwon-si (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 0 days.

(21) Appl. No.: 18/982,898

(22) Filed: Dec. 16, 2024

(65) Prior Publication Data

US 2025/0119522 A1 Apr. 10, 2025

Related U.S. Application Data

(63) Continuation of application No. PCT/KR2024/010288, filed on Jul. 17, 2024.

(30) Foreign Application Priority Data

Sep. 12, 2023 (KR) ........................ 10-2023-0121410

(51) Int. Cl.
| | |
|---|---|
| *H04N 13/271* | (2018.01) |
| *G06T 7/194* | (2017.01) |
| *H04N 13/268* | (2018.01) |

(52) U.S. Cl.
CPC ........... *H04N 13/271* (2018.05); *G06T 7/194* (2017.01); *H04N 13/268* (2018.05); *G06T 2207/10028* (2013.01)

(58) Field of Classification Search
CPC ............................................. G06F 2203/04806
See application file for complete search history.

(56) References Cited

U.S. PATENT DOCUMENTS

| | | | |
|---|---|---|---|
| 8,330,801 B2 | 12/2012 | Wang et al. | |
| 8,520,935 B2 | 8/2013 | Wang et al. | |

(Continued)

FOREIGN PATENT DOCUMENTS

| | | |
|---|---|---|
| CN | 104112275 B | 7/2017 |
| JP | 2013-137743 A | 7/2013 |

(Continued)

OTHER PUBLICATIONS

Niklaus S, Mai L, Yang J, Liu F. 3d ken burns effect from a single image. ACM Transactions on Graphics (ToG). Nov. 8, 2019;38(6):1-5. (Year: 2019).*

(Continued)

*Primary Examiner* — Clifford Hilaire
(74) *Attorney, Agent, or Firm* — Nixon & Vanderhye P.C.

(57) ABSTRACT

An electronic apparatus is disclosed. The electronic apparatus includes: a memory storing at least one instruction and at least one processor, comprising processing circuitry, individually and/or collectively, configured to: identify a foreground region and a background region included in an input image based on a depth map corresponding to the input image, and generate a novel view image by converting a viewpoint based on the foreground region; identify side effect prediction information including at least one from among whether an object of less than or equal to a specified thickness is included in the input image or an object density (Continued)

degree based on the depth map, and generate the novel view image by controlling a viewpoint movement path based on the identified side effect prediction information.

20 Claims, 18 Drawing Sheets

(56)                References Cited

U.S. PATENT DOCUMENTS

| | | | |
|---|---|---|---|
| 9,313,473 | B2 | 4/2016 | Yang et al. |
| 9,460,545 | B2 | 10/2016 | Isogai et al. |
| 11,037,362 | B2 | 6/2021 | Shin et al. |
| 2015/0003724 | A1 | 1/2015 | Noguchi |
| 2017/0188002 | A1 | 6/2017 | Chan et al. |
| 2023/0214957 | A1 | 7/2023 | Kwak et al. |
| 2024/0249422 | A1 | 7/2024 | Jampani et al. |

FOREIGN PATENT DOCUMENTS

| | | | |
|---|---|---|---|
| KR | 20110114774 | A | 10/2011 |
| KR | 101374352 | B1 | 3/2014 |
| KR | 101938205 | B1 | 1/2019 |
| KR | 20210001254 | A | 1/2021 |
| KR | 20210058320 | A | 5/2021 |
| KR | 20230022153 | A | 2/2023 |
| KR | 20230105139 | A | 7/2023 |

OTHER PUBLICATIONS

Jampani, Varun, et al., Slide: Single image 3d photography with soft layering and depth-aware inpainting, Proceedings of the IEEE/CVF International Conference on Computer Vision, 2021, 10 pages.

Mildenhall, Ben, et al., Local light field fusion: Practical view synthesis with prescriptive sampling guidelines, ACM Transactions on Graphics (TOG), 38.4, 14 pages., Jul. 2019.

Niklaus, Simon et al., 3D Ken Burns Effect from a Single Image, ACM Transactions on Graphics (ToG), 38.6, 1-15., 2019.

Shih, Meng-Li, et al., 3d photography using context-aware layered depth inpainting, Proceedings of the IEEE/CVF Conference on Computer Vision and Pattern Recognition, 11 pages., 2020.

Srinivasan, Pratul P., et al., Pushing the boundaries of view extrapolation with multiplane images, Proceedings of the IEEE/CVF Conference on Computer Vision and Pattern Recognition, 10 pages., 2019.

Zhou, Tinghui, et al., Stereo magnification: Learning view synthesis using multiplane images, arXiv preprint arXiv:1805.09817, 12 pages., May 24, 2018.

International Search Report for PCT/KR2024/010288 Mailed Oct. 22, 2024, 3 Pages.

Written Opinion for PCT/KR2024/010288 Mailed Oct. 22, 2024, 3 Pages.

* cited by examiner

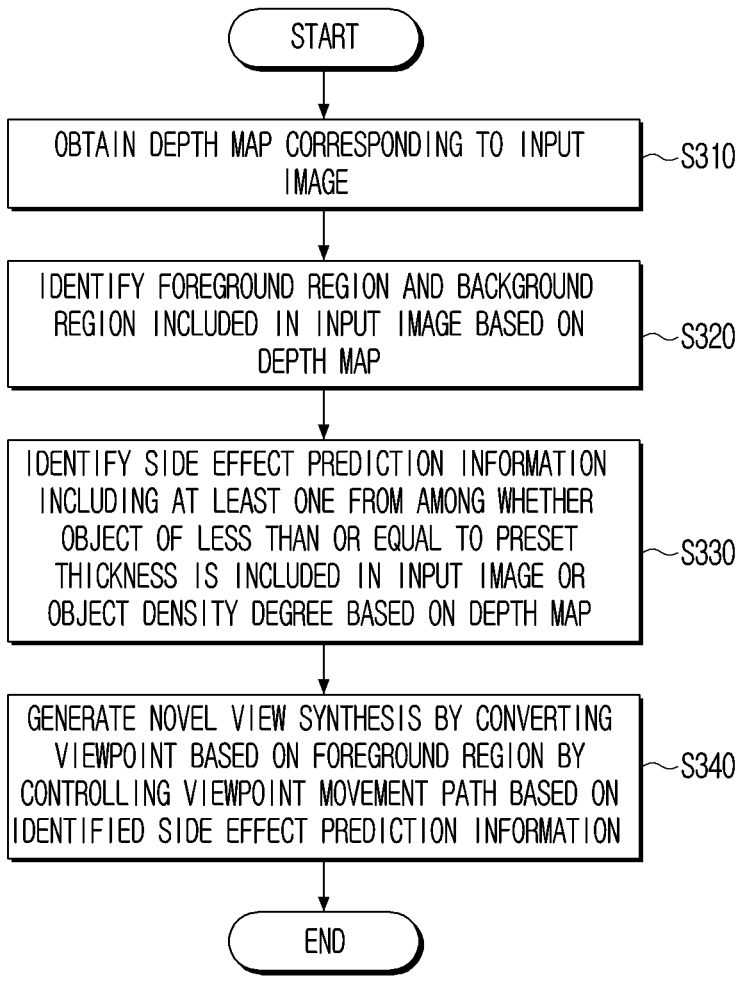

START

OBTAIN DEPTH MAP CORRESPONDING TO INPUT IMAGE — S310

IDENTIFY FOREGROUND REGION AND BACKGROUND REGION INCLUDED IN INPUT IMAGE BASED ON DEPTH MAP — S320

IDENTIFY SIDE EFFECT PREDICTION INFORMATION INCLUDING AT LEAST ONE FROM AMONG WHETHER OBJECT OF LESS THAN OR EQUAL TO PRESET THICKNESS IS INCLUDED IN INPUT IMAGE OR OBJECT DENSITY DEGREE BASED ON DEPTH MAP — S330

GENERATE NOVEL VIEW SYNTHESIS BY CONVERTING VIEWPOINT BASED ON FOREGROUND REGION BY CONTROLLING VIEWPOINT MOVEMENT PATH BASED ON IDENTIFIED SIDE EFFECT PREDICTION INFORMATION — S340

END

FIG. 6
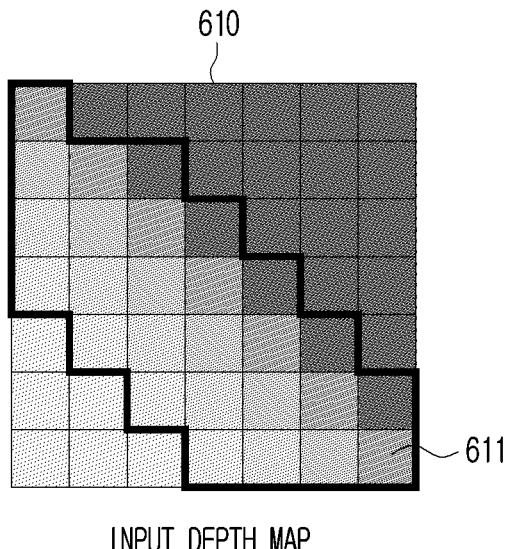
INPUT DEPTH MAP
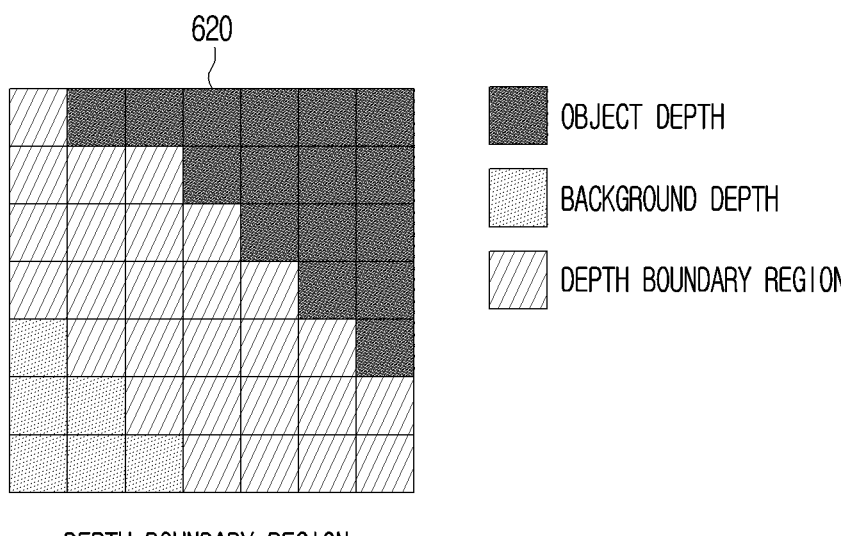
DEPTH BOUNDARY REGION
OBJECT DEPTH
BACKGROUND DEPTH
DEPTH BOUNDARY REGION

OBJECT DEPTH

BACKGROUND DEPTH

DEPTH BOUNDARY REGION

KERNEL OF MEDIAN FILTER

MEDIAN FILTER APPLICATION RESULT

MEDIAN VALUE

PIXELS SUBJECT TO FILTERING

FIG. 7B
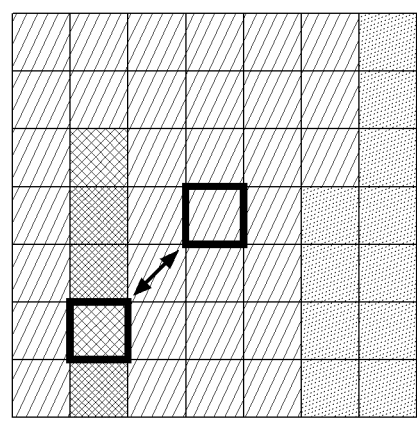
COLOR INFORMATION COMPARISON RESULT
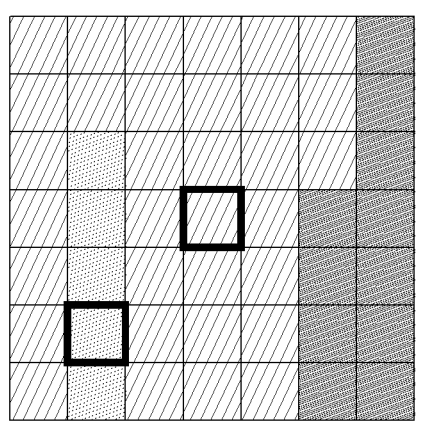
CORRESPONDING DEPTH VALUE
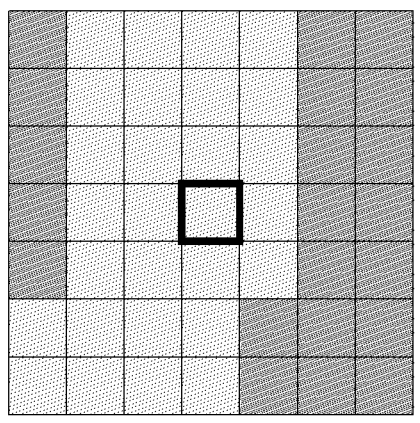
REFINED DEPTH MAP
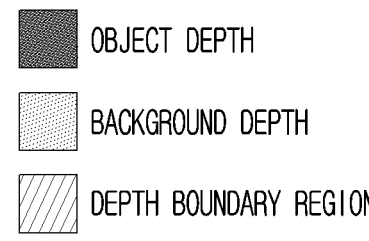
OBJECT DEPTH
BACKGROUND DEPTH
DEPTH BOUNDARY REGION

FIG. 8
810
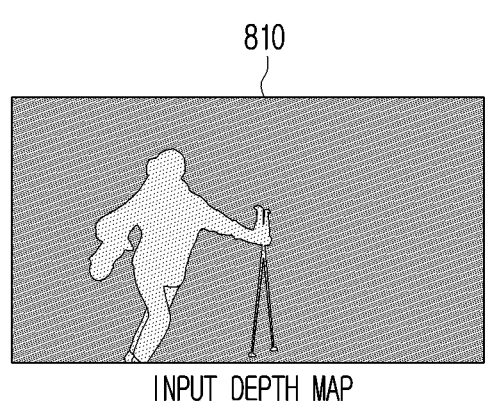
INPUT DEPTH MAP
820
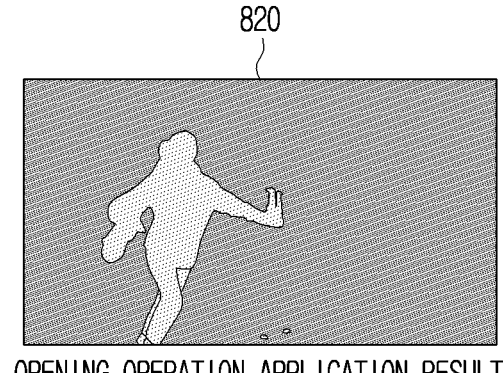
OPENING OPERATION APPLICATION RESULT
830
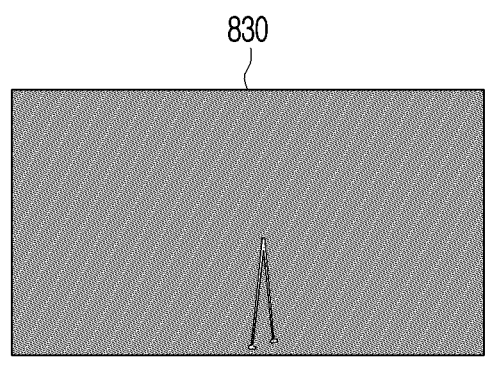
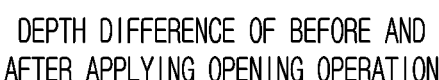
DEPTH DIFFERENCE OF BEFORE AND
AFTER APPLYING OPENING OPERATION
840
841
842
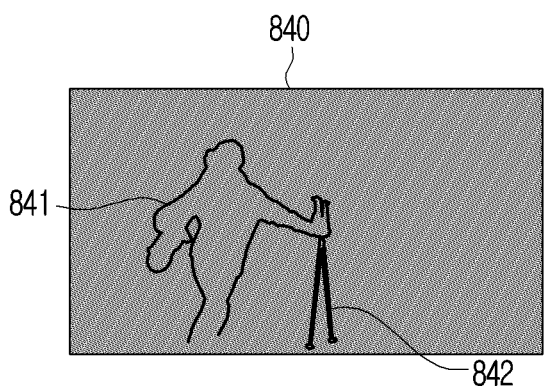
DEPTH MAP REFINEMENT APPLIED REGION

DEPTH BOUNDARY REGION OF TYPICAL OBJECT

DEPTH BOUNDARY REGION OF THIN OBJECT

FIG. 11
NEIGHBORING
BOUNDARY
TARGET
BOUNDARY
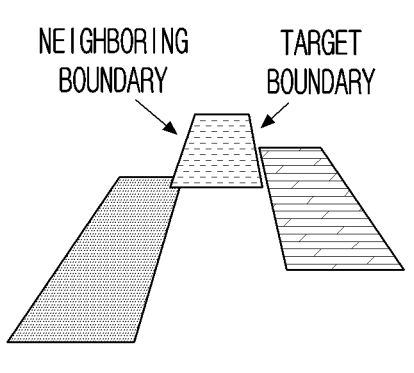
INPUT LDI
NVS
VIEWPOINT
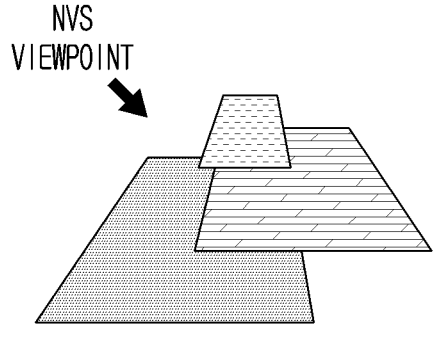
INPAINTING RESULT BEFORE OCCLUSION
REGION ADJUSTMENT
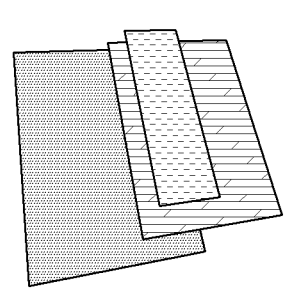
NVS RESULT BEFORE OCCLUSION
REGION ADJUSTMENT
NVS
VIEWPOINT
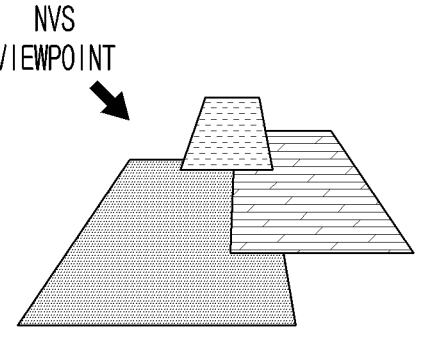
INPAINTING RESULT AFTER OCCLUSION
REGION ADJUSTMENT
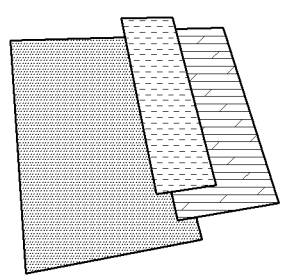
NVS RESULT AFTER OCCLUSION
REGION ADJUSTMENT 1310                    1320                    1330

TARGET BOUNDARY         CONTEXT REGION          BOUNDARY WITHIN
                                                CONTEXT REGION 1340    1350    1360

TARGET BOUNDARY  CONTEXT REGION  BOUNDARY WITHIN
CONTEXT REGION

FIG. 14
1410
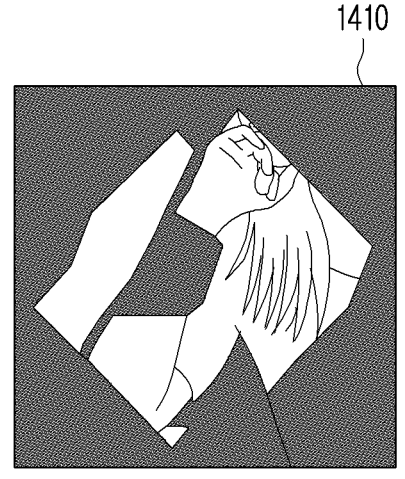
CONTEXT REGION
1420
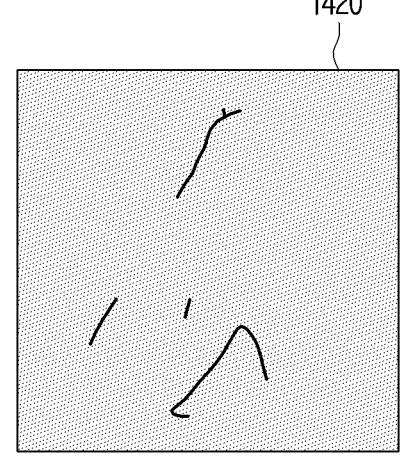
BOUNDARY WITHIN
CONTEXT REGION
1430
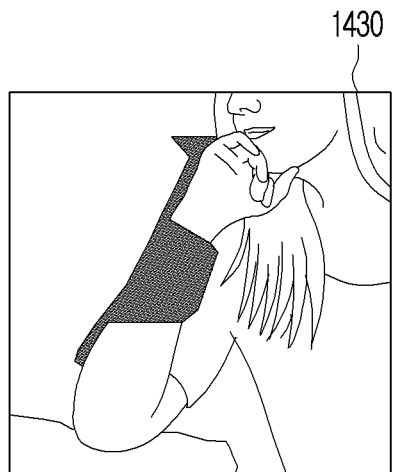
BEFORE OCCLUSION
REGION ADJUSTMENT
1440
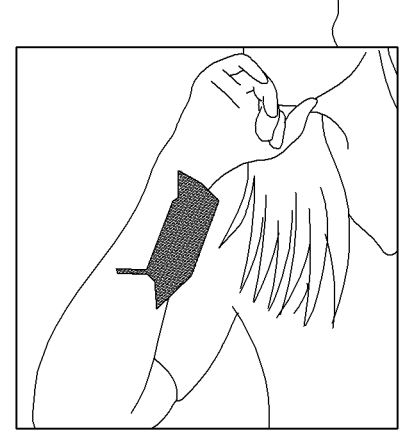
AFTER OCCLUSION
REGION ADJUSTMENT

ELECTRONIC APPARATUS AND CONTROL METHOD THEREOF

CROSS-REFERENCE TO RELATED APPLICATIONS

This application is a continuation of International Application No. PCT/KR2024/010288 designating the United States, filed on Jul. 17, 2024, in the Korean Intellectual Property Receiving Office and claiming priority to Korean Patent Application No. 10-2023-0121410, filed on Sep. 12, 2023, in the Korean Intellectual Property Office, the disclosures of each of which are incorporated by reference herein in their entireties.

BACKGROUND

Field

The disclosure relates to an electronic apparatus and a control method thereof, and for example, to an electronic apparatus that generates novel view images and the control method thereof.

Description of Related Art

Electronic devices of various types are being developed and supplied with developments in electronic technology. Specifically, display apparatuses used in various locations such as homes, offices, and public spaces have continuously been under development for several recent years.

A novel view synthesis technique is a technique which generates an image of a viewpoint different from a viewpoint of a 2-dimensional (2D) image which is obtained through a monocular camera. Using this technique, a consecutive video of a novel view image according to movement of a viewpoint trajectory for a single image may be generated.

SUMMARY

According to an example embodiment, an electronic apparatus includes: a memory storing at least one instruction and at least one processor, comprising processing circuitry, individually and/or collectively, configured to: identify a foreground region and a background region included in an input image based on a depth map corresponding to the input image, and generate a novel view image by converting a viewpoint based on the foreground region; identify side effect prediction information including at least one from among whether an object of less than or equal to a specified thickness is included in the input image or an object density degree based on the depth map, and generate the novel view image by controlling a viewpoint movement path based on the identified side effect prediction information.

According to an example embodiment, at least one processor, individually and/or collectively, may be configured to: generate, based on the object of less than or equal to the specified thickness being identified as included in the input image or the object density degree being identified as greater than or equal to a threshold value based on the depth map, the novel view image by controlling reduction of the viewpoint movement path to less than a threshold range.

According to an example embodiment, at least one processor, individually and/or collectively, may be configured to: control, based on the object of less than or equal to the specified thickness being identified as included in the input image based on the depth map, reduction of the viewpoint movement path in proportion to an area ratio which the object of less than or equal to the specified thickness occupies in the input image.

According to an example embodiment, at least one processor may be configured to: obtain a depth map applied with an opening operation by applying the opening operation to the depth map, and identify a region included with the object of less than or equal to the specified thickness based on difference information between the depth map and the depth map applied with the opening operation.

According to an example embodiment, at least one processor may be configured to: calculate a standard deviation of depth values of pixels excluding a depth boundary region within the window by applying the window to the depth map, and perform a depth map refinement based on the calculated standard deviation being greater than or equal to a threshold value.

According to an example embodiment, at least one processor may be configured to: generate, based on the object density degree being identified as greater than or equal to a threshold value based on the depth map, the novel view image by controlling reduction of the viewpoint movement path to less than a threshold range.

According to an example embodiment, at least one processor may be configured to: adjust an occlusion region and a context region based on a boundary complexity indicating the object density degree, and the occlusion region may be a region not exposed by the foreground region from a current viewpoint and exposed at movement of the viewpoint, and the context region may be a region adjacent with the occlusion region.

According to an example embodiment, at least one processor may be configured to: identify the boundary complexity based on a number of neighboring boundaries included within the context region, and reduce a width of at least one from among the occlusion region and the context region based on the number of neighboring boundaries being greater than or equal to a threshold number.

According to an example embodiment, at least one processor may be configured to: refine the depth map by substituting a depth value of a region corresponding to the object of less than or equal to the specified thickness with a depth value of a surrounding pixel having the most similar color information with a target pixel.

According to an example embodiment, at least one processor may be configured to: refine the depth map by substituting a depth value of other than the region corresponding to the object of less than or equal to the specified thickness with a median value of depth values of pixels within a window.

According to an example embodiment, a method of controlling an electronic apparatus includes: identifying a foreground region and a background region included in an input image based on a depth map corresponding to the input image and generating a novel view image by converting a viewpoint based on the foreground region, and the generating a novel view image includes identifying side effect prediction information including at least one from among whether an object of less than or equal to a specified thickness is included in the input image or an object density degree based on the depth map, and generating the novel view image by controlling a viewpoint movement path based on the identified side effect prediction information.

According to an example embodiment, a non-transitory computer-readable medium storing computer commands for an electronic apparatus to perform an operation when executed by at least one processor, individually and/or collectively, of the electronic apparatus, the operation including: identifying a foreground region and a background region included in an input image based on a depth map corresponding to the input image and generating a novel view image by converting a viewpoint based on the foreground region, and the generating a novel view image includes identifying side effect prediction information including at least one from among whether an object of less than or equal to a specified thickness is included in the input image or an object density degree based on the depth map, and generating the novel view image by controlling a viewpoint movement path based on the identified side effect prediction information.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3 is a flowchart illustrating an example method of controlling an electronic apparatus according to various embodiments;

FIG. 6 is a diagram illustrating an example method of identifying a depth boundary region according to various embodiments;

FIG. 7A and FIG. 7B are diagrams illustrating an example method of refining a depth map according to various embodiments;

FIG. 8 is a diagram illustrating examples of an example process of identifying a thin object in a depth map using an opening operation according to various embodiments;

FIG. 11 is a diagram illustrating a side effect generated by an occlusion region being excessively set according to various embodiments;

FIG. 14 is a diagram illustrating an example method of adjusting an occlusion region according to various embodiments.

DETAILED DESCRIPTION

Figure 1:
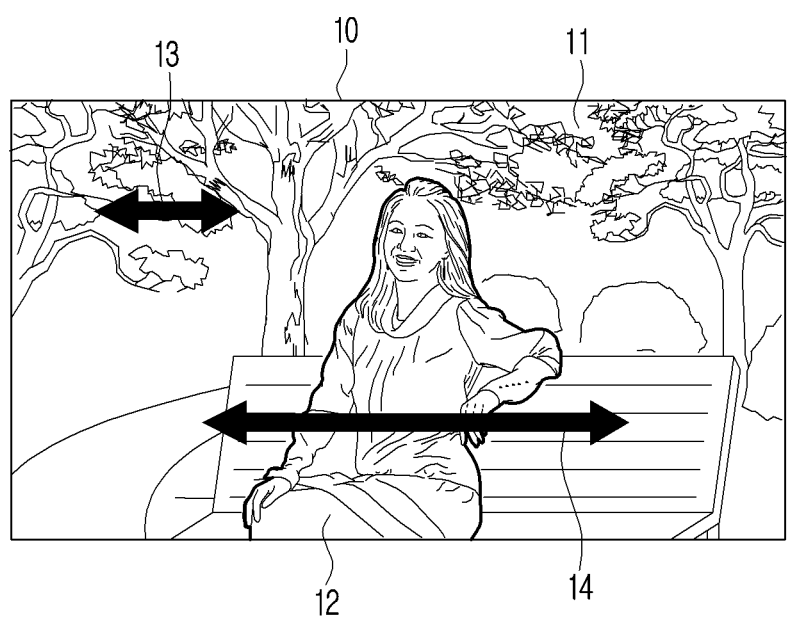
FIG. 1 is a diagram illustrating an example novel view synthesis technique according to various embodiments.

Terms used in the disclosure will be briefly described, and the disclosure will be described in greater detail.

The terms used in the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the relevant description. Accordingly, the terms used herein are not to be understood simply as its designation but based on the meaning of the term and the overall context of the disclosure.

In the disclosure, expressions such as "have", "may have", "include", and "may include" are used to designate a presence of a corresponding characteristic (e.g., elements such as numerical value, function, operation, or component), and not to preclude a presence or a possibility of additional characteristics.

In the disclosure, expressions such as "A or B", "at least one of A and/or B", or "one or more of A and/or B" may include all possible combinations of the items listed together. For example, "A or B", "at least one of A and B", or "at least one of A or B" may refer to all cases including (1) only A, (2) only B, or (3) both A and B.

Expressions such as "1st", "2nd", "first" or "second" used in the disclosure do not limit various elements regardless of order and/or importance, and may be used merely to distinguish one element from another element and not limit the relevant element.

When a certain element (e.g., a first element) is indicated as being "(operatively or communicatively) coupled with/to" or "connected to" another element (e.g., a second element), it may be understood as the certain element being directly coupled with/to the another element or as being coupled through other element (e.g., a third element).

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily refer, for example, to being "specifically designed to" in terms of hardware.

In certain circumstances, the expression "a device configured to . . . " may refer, for example, to something that the device "may perform . . . " together with another device or components. For example, a phrase "a processor configured to (or set up to) perform A, B, or C" may refer to a dedicated processor for performing a relevant operation (e.g., embedded processor), or a generic-purpose processor (e.g., a central processing unit (CPU) or an application processor) capable of performing the relevant operations by executing one or more software programs stored in a memory device.

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used in various embodiments herein perform at least one function or operation, and may be implemented with a hardware or software, or implemented with a combination of hardware and software. In addition, a plurality of "modules" or a plurality of "parts," except for a "module" or a "part" which needs to be implemented to a specific hardware, may be integrated in at least one module and implemented as at least one processor (not shown).

The various elements and regions of the drawings have been schematically illustrated. Accordingly, the technical spirit of the disclosure is not limited by relative sizes and distances illustrated in the accompanied drawings.

Various example embodiments of the disclosure will be described in greater detail below with reference to the accompanied drawings.

FIG. 1 is a diagram illustrating an example novel view synthesis technique according to various embodiments.

A novel view synthesis technique may refer to a technique which generates an image of a novel viewpoint different from a viewpoint of a 2-dimensional (2D) image which is obtained through a monocular camera. Using this technique, a consecutive video of a novel view image according to movement of a viewpoint trajectory for a single image may be generated. (https://shihmengli.github.io/3D-Photo-In-painting/content.sniklaus.com/kenburns/video.mp4).

In the related art, a novel view image 10 generated based on depth information may include characteristics of a background object 11 being moved slightly 13 and a foreground object 12 being moved more 14 as shown in FIG. 1.

In a foreground-background separation based technique according to an example, a foreground and a background are separated based on a depth map, a viewpoint is transformed based on the foreground, and an image viewed from a random viewpoint may be generated by filling in an occlusion region, which is generated according to a change in viewpoint, with the background. In this case, an accurate separation of the foreground and the background is required to obtain a natural rendering effect. However, with a depth map estimated using a monocular image, or a stereo image, consecutive values are estimated near a boundary of the foreground and the background due to a characteristic of a regression technique. Accordingly, accurately identifying the boundary when separating the foreground and the background may be the key technique for generating good quality image.

For accurately identifying the foreground and background boundary, a deep learning-based alpha matting technique may be used. However, because the relevant technique operates under a premise that only one foreground object is present in an image, several side effects may be caused due to the object becoming more complex. In addition thereto, with techniques that find a depth boundary region in which the boundary of the foreground and the background is obscure and identify the boundary by applying a median filter to the relevant region, if a region corresponding to the foreground in the filter is small, the region may be allocated to the background due to a characteristic of a median filter and thereby, there may be a problem of a thin foreground object disappearing.

As described, problems such as inaccurate depth estimation and filling of occlusion region may cause several side effects, and there is a tendency of the problem being greatly emphasized as a movement path of a newly generated viewpoint becomes bigger. For example, problems such as a hall being filled in error, or a thin object not being properly separation processed may occur.

In order to minimize and/or reduce the side effect that can occur when generating an image, the novel view synthesis technique of the related art may use a viewpoint movement path of a fixed range for all images, or control the viewpoint movement path to a region in which a size of the occlusion region is small. However, if the fixed viewpoint movement path is used, a side effect occurring within the movement path may be unavoidable. In addition, because only an image of a limited viewpoint is generated, a limited stereoscopic image may be provided to the user. In addition, if the viewpoint is moved to only regions in which the size of the occlusion region is small, there is a problem of a viewpoint which can be generated being limited.

For example, there is a problem of boundaries of objects being bent or stretched because the boundaries of objects are not accurately divided at estimated depths through the monocular image. In response to the above, a depth map refinement is performed as a post-processing operation, but because a depth map refinement technique of the related art is not able to properly respond to a thin object, various side effects may be caused a novel view generation result.

Accordingly, various embodiments that avoid or minimize/reduce side effects by controlling a movement path of a viewpoint which is newly generated by predicting in advance the various side effects that can occur from a generated image will be described in greater detail below.

Figure 2A:
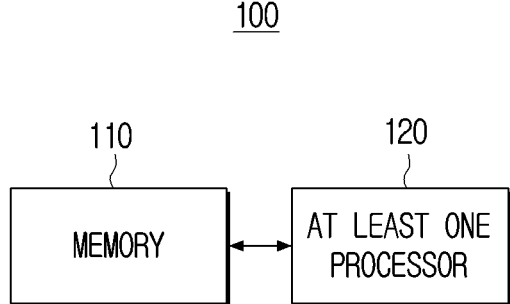
FIG. 2A is a block diagram illustrating an example configuration of an electronic apparatus according to various embodiments.

FIG. 2A is a block diagram illustrating an example configuration of an electronic apparatus according to various embodiments.

Referring to FIG. 2A, an electronic apparatus 100 may include a memory 110 and at least one processor (e.g., including processing circuitry) 120.

The memory 110 may be implemented in a form of a memory embedded in an electronic apparatus 100 according to a data storage use, or in a form of a memory attachable to or detachable from the electronic apparatus 100. For example, data for the driving of the electronic apparatus 100 may be stored in a memory embedded in the electronic apparatus 100, and data for an expansion function of the electronic apparatus 100 may be stored in a memory attachable to or detachable from the electronic apparatus 100. The memory embedded in the electronic apparatus 100 may be implemented as at least one from among a volatile memory (e.g., a dynamic random access memory (DRAM), a static RAM (SRAM), or a synchronous dynamic RAM (SDRAM)), or a non-volatile memory (e.g., one time programmable read only memory (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)). In addition, the memory attachable to or detachable from the electronic apparatus 100 may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port (e.g., a USB memory), or the like.

In an example, the memory 110 may store at least one instruction for controlling the electronic apparatus 100 or computer programs including instructions.

In another example, the memory 110 may store images, that is, input images received from an external apparatus (e.g., a source device), an external storage medium (e.g., a USB), an external server (e.g., WEBHARD), and the like. Alternatively, the memory 110 may store images obtained through a camera (not shown) provided in the electronic apparatus 100. Here, an image may be 2-dimensional (2D) moving image, but is not limited thereto.

In still another example, the memory 110 may store various information necessary in image quality processing, information for performing at least one from among, for example, noise reduction, detail enhancement, tone mapping, contrast enhancement, color enhancement, or frame rate conversion, algorithms, image quality parameters, and the like. In addition, the memory 110 may store intermediate images generated by image processing, and images generated based on depth information.

According to an embodiment, the memory 110 may be implemented as a single memory which stores data generated from various operations according to the disclosure. However, according to an embodiment, the memory 110 may be implemented to include a plurality of memories that respectively stores data of different types, or respectively stores data generated from different stages.

In an embodiment, various data has been described as being stored in an external memory 110 of the processor 120, but at least a portion from among the above-described data may be stored in a memory inside the processor 120 according to at least one implementation example of the electronic apparatus 100 or the processor 120.

The at least one processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions, and control the overall operation of the electronic apparatus 100. For example, the at least one processor 120 may control the overall operation of the electronic apparatus 100 by being connected with each configuration of the electronic apparatus 100. For example, the at least one processor 120 may control the overall operation of the electronic apparatus 100 by being electrically connected with a display 130 and the memory 110. The at least one processor 120 may be formed of one or a plurality of processors.

The at least one processor 120 may perform an operation of the electronic apparatus 100 according to various embodiments by executing at least one instruction stored in the memory 110.

At least one processor 120 may include at least one from among a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The at least one processor 120 may control one or a random combination from among other elements of the electronic apparatus, and perform an operation associated with communication or data processing. The at least one processor 120 may execute at least one program or instruction stored in the memory. For example, the at least one processor may perform, by executing at least one instruction stored in the memory, a method according to various embodiments of the disclosure.

When a method according to various embodiments of the disclosure includes a plurality of operations, the plurality of operations may be performed by one processor, or performed by a plurality of processors. For example, when a first operation, a second operation, and a third operation are performed by a method according to various embodiments, the first operation, the second operation, and the third operation may all be performed by a first processor, or the first operation and the second operation may be performed by the first processor (e.g., a generic-purpose processor) and the third operation may be performed by a second processor (e.g., an artificial intelligence dedicated processor).

The at least one processor 120 may be implemented as a single core processor that includes one core, or as at least one multicore processor that includes a plurality of cores (e.g., a homogeneous multicore or a heterogeneous multicore). If the at least one processor 120 is implemented as a multicore processor, each of the plurality of cores included in the multicore processor may include a memory inside the processor such as a cache memory and an on-chip memory, and a common cache shared by the plurality of cores may be included in the multicore processor. In addition, each of the plurality of cores (or a portion from among the plurality of cores) included in the multicore processor may independently read and perform a program command for implementing a method according to various embodiments, or read and perform a program command for implementing a method according to various embodiments of the disclosure due to a whole (or a portion) of the plurality of cores being interconnected.

When a method according to various embodiments of the disclosure includes a plurality of operations, the plurality of operations may be performed by one core from among the plurality of cores or performed by the plurality of cores included in the multicore processor. For example, when a first operation, a second operation, and a third operation are performed by a method according to various embodiments, the first operation, the second operation, and the third operation may all be performed by a first core included in the multicore processor, or the first operation and the second operation may be performed by the first core included in the multicore processor and the third operation may be performed by a second core included in the multicore processor.

According to various embodiments of the disclosure, the processor may refer to a system on chip (SoC), a single core processor, or a multicore processor in which the at least one processor and other electronic components are integrated or a core included in the single core processor or the multicore processor, and the core herein may be implemented as the CPU, the GPU, the APU, the MIC, the DSP, the NPU, the hardware accelerator, the machine learning accelerator, or the like, but is not limited. However, for convenience of description, the at least one processor 120 may be designated as the processor 120 below.

The processor 120 may obtain depth information from an input image. Here, the input image may include a still image, a plurality of continued still images (or frames), or a moving image. For example, an input image may be a 2D image. Here, depth information may be in a depth map form. Depth map may refer, for example, to a table which includes depth information for each region of an image. The region may be classified in pixel units, or defined as preset regions which is greater than the pixel units. In an example, the depth map may be in a form that indicates 127 or 128 from among grayscale values from 0 to 255 as a reference value, that is, 0 (or a focal plane) and indicate values smaller than 127 or 128 as a negative (−) value, and greater than 127 or 128 as a positive (+) value. A reference value of the focal plane may be randomly selected between 0 and 255. Here, the – value may refer, for example, to precipitation, and + value may refer, for example, to projection. However, the above is merely one example, and the depth map may represent depth with various values according to various standards.

In an example, the processor 120 may obtain depth information based on an image processed image after having image processed an input image. Here, the image processing may be a digital image processing which includes at least one from among image enhancement, image restoration, image transformation, image analysis, image understanding, image compression, image decoding, or scaling.

In an example, various pre-processing may be performed prior to obtaining depth information on an input image, but for convenience of description below, the input image and the pre-processed image will not be distinguished and designated as the input image.

The processor 120 may store depth information corresponding to the input image in the memory 110. In an example, the processor 120 may, based on a first image frame and a second image frame being sequentially input, apply pre-processing and/or post-processing on the first image frame and the second image frame, obtain and store first depth information and second depth information corresponding to the first image frame and the second image frame sequentially in the memory 110. Here, the first image frame and the second image frame may be a 2D monocular image frame.

In an example, the processor 120 may obtain depth information of the first image frame and the second image frame based on various image processing methods such as, for example, and without limitation, algorithms, equations, artificial intelligence models, and the like.

Figure 2B:
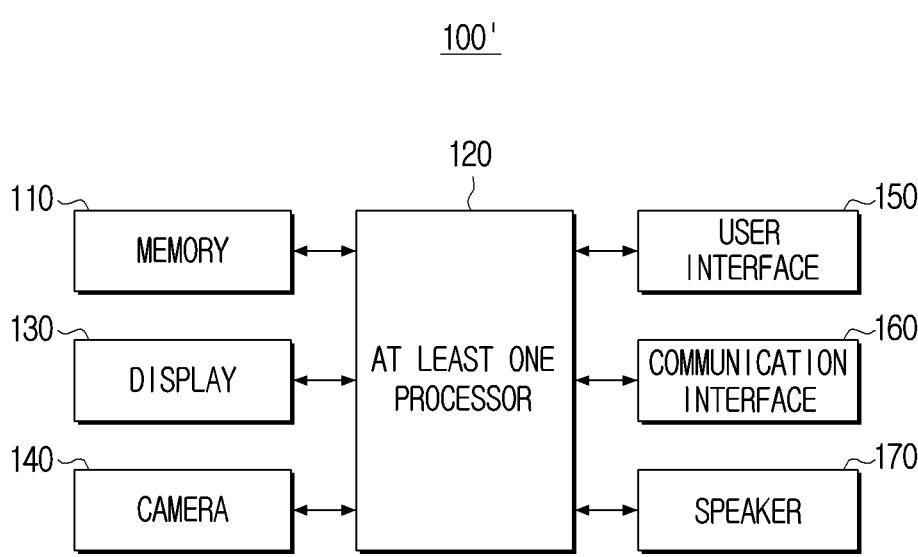
FIG. 2B is a block diagram illustrating an example configuration of an electronic apparatus according to various embodiments.

FIG. 2B is a block diagram illustrating an example configuration of an electronic apparatus according to various embodiments.

Referring to FIG. 2B, the electronic apparatus 100' may include the memory 110, at least one processor (e.g., including processing circuitry) 120, the display 130, a camera 140, a user interface (e.g., including circuitry) 150, a communication interface (e.g., including communication circuitry) 160, and a speaker 170. Detailed descriptions of configurations that overlap with the configurations shown in FIG. 2A from among the configurations shown in FIG. 2B may not be repeated here.

The display 130 may be implemented as a display including self-emissive devices or a display including non-emissive devices and a backlight. For example, the display 130 be implemented as a display of various forms such as, for example, and without limitation, a liquid crystal display (LCD), an organic light emitting diode (OLED) display, a light emitting diode (LED), a micro LED, a mini LED, a plasma display panel (PDP), a quantum dot (QD) display, a quantum dot light emitting diodes (QLED), or the like. In the display 130, a driving circuit, which may be implemented in a form of an a-si TFT, a low temperature poly silicon (LTPS) TFT, an organic TFT (OTFT), or the like, a backlight unit, and the like may be included. In an example, a touch sensor with a form such as a touch film, a touch sheet, or a touch pad that senses a touch operation may be disposed at a front surface of the display 130 to sense touch inputs of various types. For example, the display 130 may sense touch inputs of various types such as, for example, and without limitation, a touch input by a hand of a user, a touch input by an input device such as a stylus pen, a touch input by a specific electrostatic material, and the like. The input device may be implemented in an input device of a pen type which may be referred to in various terms such as, for example, and without limitation, an electronic pen, a stylus pen, an S-pen, or the like. In an example, the display 130 may be implemented as a flat display, a curved display, a folding and/or a rollable flexible display, or the like.

The camera 140 may be turned-on according to a preset event and perform capturing. The camera 140 may convert the captured image into an electric signal and generate image data based on the converted signal. For example, a subject may be converted to an electric image signal through a semiconductor optical device (a charge coupled device (CCD)), and the converted image signal as described above may be signal processed after being amplified and converted to a digital signal. For example, the camera 140 may include at least one from among a general (or basic) camera and an ultra-wide angle camera.

The user interface 150 may include various circuitry and may be implemented as a device such as a button, a touch pad, a mouse, and a keyboard, or implemented as a touch screen or the like capable of performing the above-described display function and an operation input function together therewith.

The communication interface 160 may include various communication circuitry and may be implemented in various interfaces according to an implementation of the electronic apparatus 100'. For example, the communication interface 160 may perform communication with external devices, external storage mediums (e.g., USB memory), an external server (e.g., WEBHARD), and the like through communication methods such as, for example, and without limitation, Bluetooth, an AP-based Wi-Fi (a Wireless LAN network), Zigbee, a wired/wireless local area network (LAN), a wide area network (WAN), Ethernet, IEEE 1394, a high-definition multimedia interface (HDMI), a universal serial bus (USB), a mobile high-definition link (MHL), Audio Engineering Society/European Broadcasting Union (AES/EBU), Optical, Coaxial, or the like. In an example, the communication interface 160 may perform communication with another electronic apparatus, an external server and/or a remote control device, and the like.

The speaker 170 may include a configuration that outputs not only various audio data, but also various notification sounds, voice messages, and the like. The processor 120 may control the speaker 170 to output feedback or various notifications according to various embodiments of the disclosure in audio form.

In addition thereto, the electronic apparatus 100' may include a sensor and a microphone according to an implementation.

The sensor may include sensors of various types such as, for example, and without limitation, a touch sensor, a proximity sensor, an acceleration sensor (or gravity sensor), a geomagnetic sensor, a gyro sensor, a pressure sensor, a position sensor, a distance sensor, an illuminance sensor, and the like.

The microphone may be a configuration for receiving input of a user voice or other sounds and converting to audio data. However, in an embodiment, the electronic apparatus 100' may receive the user voice input through an external device through the communication interface 160.

FIG. 3 is a flowchart illustrating an example method of controlling an electronic apparatus according to various embodiments.

Referring to FIG. 3, the electronic apparatus 100 may obtain a depth map corresponding to an input image (S310). The depth map (or depth information) may indicate 3-dimensional (3D) distance information of an object present in the image, and may be provided for each pixel of the image. In an example, an 8-bit depth may have a grayscale value between 0 and 255. For example, when representing based on black and white colors, the black color (low value) may indicate a far place from a viewer, and the white color (high value) may indicate a close place to the viewer. In an example, a depth map may be obtained from a 2D input image based on a depth estimation algorithm of the related art, an equation, a trained artificial intelligence model, and the like. For example, the artificial intelligence model may be implemented as a neural network that includes a plurality of neural network layers. The artificial intelligence model may be implemented as a deep neural network (DNN), a convolutional neural network (CNN), a recurrent neural network (RNN), a Restricted Boltzmann Machine (RBM), a Deep Belief Network (DBN), a bidirectional recurrent deep neural network (BRDNN), a Deep Q-Networks, or the like, but is not limited thereto.

The electronic apparatus 100 may identify a foreground region and a background region included in the input image based on the depth map (S320).

The electronic apparatus 100 may identify side effect prediction information including at least one from among whether an object of less than or equal to a preset (e.g., specified) thickness is included in the input image or an object density degree based on the depth map (S330). For example, if a thin object is included in the input image when performing the novel view synthesis, because there is a likelihood of the various side effects described in FIG. 1 occurring when a plurality of objects is concentrated and the like, the above may be defined as side effect prediction information and the side effect prediction information may be identified in the input image.

The electronic apparatus 100 may generate the novel view image by converting the viewpoint based on the foreground region by controlling the viewpoint movement path based on the identified side effect prediction information (S340). For example, the viewpoint movement path may be controlled based on a level of the side effect prediction information. If the side effect is predicted to be severe, the viewpoint is moved within a relatively limited range to minimize and/or reduce the side effect.

According to an example, the electronic apparatus 100 may generate, based on the object of less than or equal to the preset thickness being identified as included in the input image or the object density degree being identified as greater than or equal to a threshold value based on the depth map, the novel view image by controlling reduction of the viewpoint movement path to less than a threshold range.

In an example, the electronic apparatus 100 may control, based on the object of less than or equal to the preset thickness being identified as included in the input image based on the depth map, reduction of the viewpoint movement path in proportion to an area ratio which the object of less than or equal to the preset thickness occupies in the input image.

In an example, the electronic apparatus 100 may obtain a depth map applied with an opening operation by applying the opening operation to the depth map, and identify a region included with the object of less than or equal to the preset thickness based on difference information between the depth map and the depth map applied with the opening operation.

In an example, the electronic apparatus 100 may refine the depth map by substituting a depth value of the region corresponding to the object of less than or equal to the preset thickness with a depth value of a surrounding pixel that has the most similar color information with a target pixel.

In an example, the electronic apparatus 100 may generate, based on the object density degree being identified as greater than or equal to the threshold value based on the depth map, the novel view image by controlling reduction of the viewpoint movement path to less than the threshold range.

In an example, the electronic apparatus 100 may refine the depth map by substituting a depth value of other than the region corresponding to the object of less than or equal to the preset thickness with a median value of depth values of pixels in a window.

In an example, the electronic apparatus 100 may calculate a standard deviation of the depth values of pixels which exclude the depth boundary region in the window by applying a preset window to the depth map, and perform the depth map refinement when the calculated standard deviation is greater than or equal to the threshold value.

In an example, the electronic apparatus 100 may adjust the occlusion region and a context region based on a boundary complexity which indicates the object density degree. For example, the occlusion region may be a region that is not exposed in the foreground region at a current viewpoint and exposed at movement of the viewpoint. For example, the context region may be a region adjacent with the occlusion region.

In an example, the electronic apparatus 100 may identify the boundary complexity based on a number of neighboring boundaries included in the context region. The electronic apparatus 100 may reduce a width of at least one from among the occlusion region and the context region when the number of neighboring boundaries is greater than or equal to a threshold number.

Figure 4:
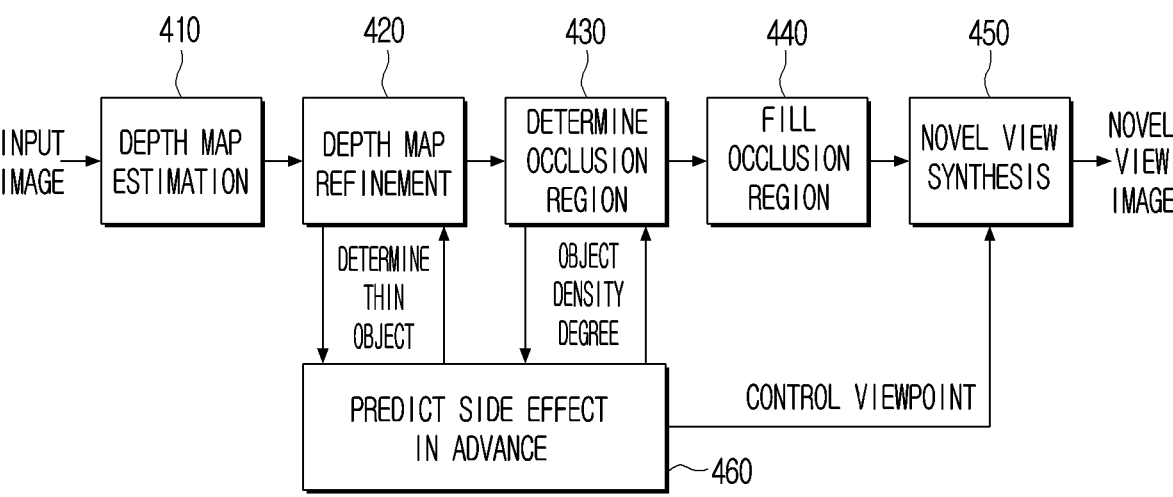
FIG. 4 and FIG. 5 include a diagram and flowchart illustrating an example method of controlling an electronic apparatus according to various embodiments.
Figure 5:
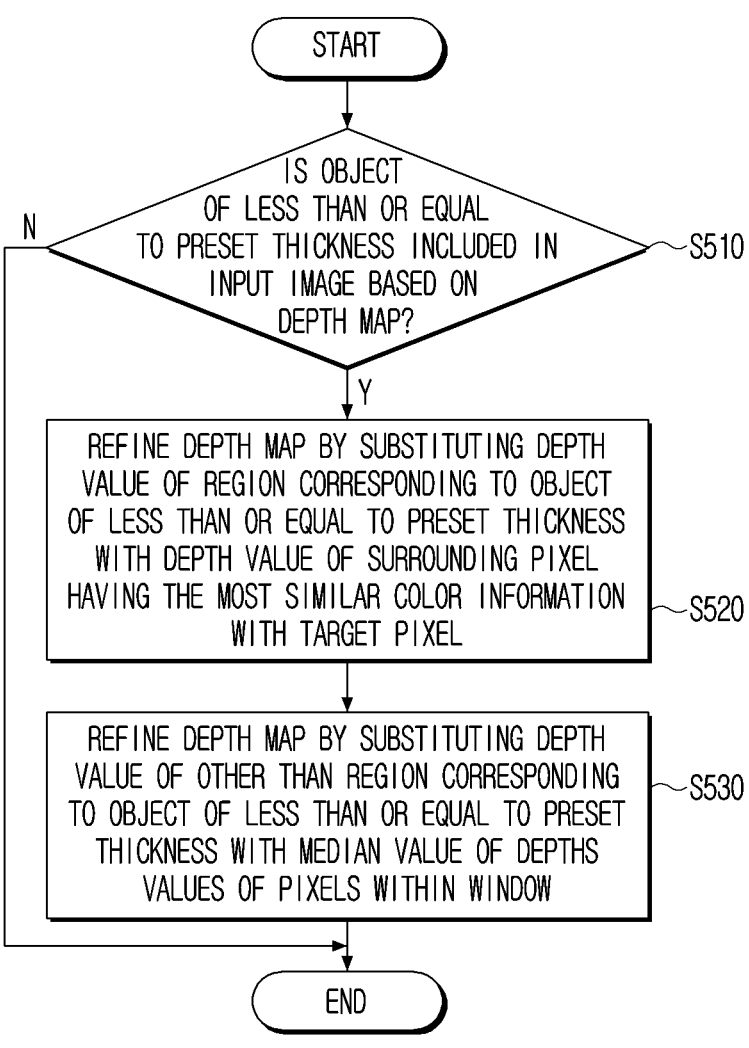

FIG. 4 and FIG. 5 include a diagram and flowchart illustrating an example method of controlling an electronic apparatus according to various embodiments.

Referring to FIG. 4, the processor 120 may estimate the depth map from the input image (410).

Then, the processor 120 may refine the depth map (420) based on the side effect prediction information (460). In an example, as shown in FIG. 5, the processor 120 may identify whether a foreground object of less than or equal to a preset thickness is included in an input image based on a depth map (S510). The processor 120 may refine, based on the foreground object of less than or equal to the preset thickness being identified as included in the input image, the depth map by substituting the depth value of the region corresponding to the object of less than or equal to the preset thickness with the depth value of the surrounding pixel which has the most similar color information with the target pixel (S520). For example, the processor 120 may perform, based on a side effect being predicted according to a thin object being present in the input image, the depth map refinement based on a color information comparison. In addition, the processor 120 may refine the depth map by substituting the depth value of other than the region corresponding to the object of less than or equal to the preset thickness with the median value of the depth values of the pixels in the window (S530).

In an example, the processor 120 may precisely separate the foreground region and the background region by refining the boundary region of a predicted depth map object. To this end, the boundary region of the object in the depth map may be identified and then, a size of the object may be identified through a morphological operation. For example, the processor 120 may identify an object region included in the input image through at least one technique from among object recognition, object detection, object tracking, or image segmentation. For example, the processor 120 may identify the object region using techniques such as, for example, and without limitation, semantic segmentation which classifies and extracts objects included in the input image by type according to necessity, instance segmentation which recognizes objects by classifying the same by object even if it is an object of a same type, a bounding box of a quadrangle form which includes the detected object when detecting the object included in the image, and the like.

In an example, the processor 120 may refine the depth map by selectively applying a median filter based refinement and a color information comparison based refinement based on a thickness (or size) of the identified object region. For example, a same process may be repeated several times (e.g., five times) for a more accurate refinement result.

For example, the processor 120 may use a depth value difference between neighboring pixels to determine the object and the background or the boundary regions of two objects in the depth map. For example, the processor 120 may define a pixel having a depth difference from a center pixel being greater than or equal to a certain value from among four neighboring pixels of top, bottom, left and right as the depth boundary region. For example, as shown in FIG. 6, a region 611 including the pixel having the depth difference from the center pixel being greater than or equal to the certain value from among the four neighboring pixels of top, bottom, left and right in a depth map 610 may be identified as the depth boundary region (620).

In an example, the processor 120 may repeatedly perform the depth map refinement for the identified boundary region several times (e.g., five times). The processor 120 may adaptively use one from among a median filter based refinement method or a generation information comparison based refinement method according to whether or not a thin object is present at refinement. Each refinement method may be performed within a window of a preset size, and the refinement may not be performed if the depth boundary region is not included within the window.

Figure 7A:
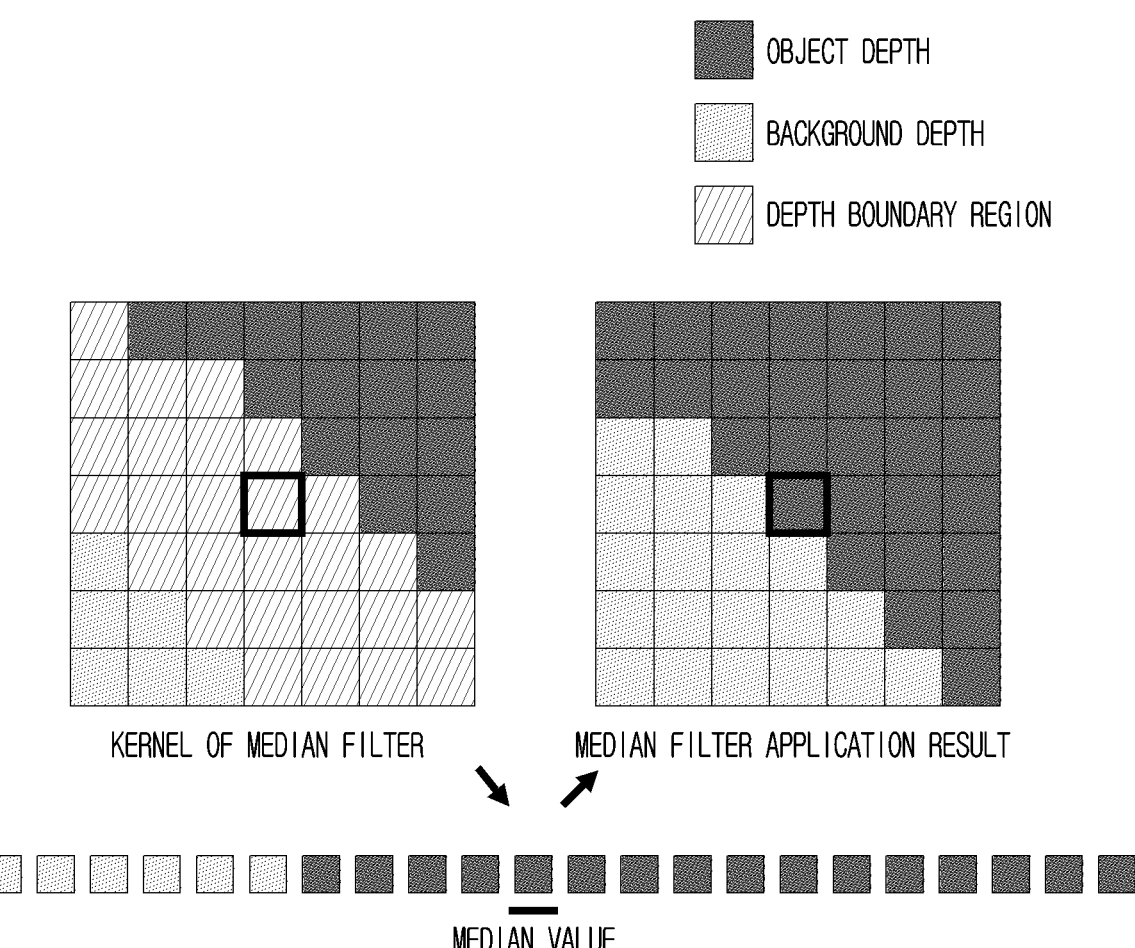

FIG. 7A and FIG. 7B are diagrams illustrating an example method of refining a depth map according to various embodiments.

FIG. 7A illustrates a median filter based refinement process according to an example.

The median filter based refinement may be a method of allocating the median value of depth values of pixels present within the window as an output value. In this process, the pixels of the depth boundary region may be excluded. The median filter based refinement method may stably obtain a depth boundary and is effective in mitigating a depth value inversion phenomenon which occurs in the depth boundary. However, with a thin object, because most of the object is include in the depth boundary region, a problem of the thin object disappearing may occur due to the thin object being output as a background depth value when applying the median filter.

FIG. 7B illustrates a color information comparison based refinement process according to an example.

The color information comparison based refinement method is method which allocates a depth value of a pixel having the most similar color value with the pixel subject to refinement from among the pixels within the window as the output value. In this process, the pixels of the depth boundary region may be excluded from the comparison.

In an example, a degree of similarity of the color values may be calculated with a Euclidean distance between the pixel subject to refinement and the pixel subject to comparison. With the color information comparison based refinement method, a precise depth map refinement may be possible even when the object is thin. However, in the refinement process, an unstable depth boundary may be generated when there is no similar pixel present within the window.

Accordingly, the processor 120 may select a refinement method adaptively based on whether the thin object is present within the input depth map. For example, if the depth boundary region is determined as the thin object, the color information comparison based refinement may be performed, and if it is not determined as the thin object, the median filter based refinement may be performed. The processor 120 may use the opening operation which is the morphological operation according to an example to determine the thin object. The opening operation is an operation of applying a dilation operation following an erosion operation, and the opening, erosion, and dilation operations may be represented as Equation 1 below.

$$B \circ S = (B \ominus S) \oplus S \quad \text{[Equation 1]}$$

$$B \ominus S = \{t \mid S_t \subset B\}, B \oplus S = \bigcup_{b \in B} S_b.$$

A size of a structuring element S used for the opening operation may be same as or similar to a size of the window for refinement. The processor 120 may determine as the thin object based on a difference between a result obtained by applying the opening operation and the input depth map being greater than or equal to a threshold value.

FIG. 8 is a diagram illustrating examples of an example process of identifying a thin object in a depth map using an opening operation according to various embodiments.

For example, the processor 120 may obtain an image 820 applied with the opening operation by applying the opening operation to a depth map 810 as shown in FIG. 8. The processor 120 may identify a thin object region based on an image 830 that indicates a depth difference before and after the application of the opening operation. Then, the processor 120 may perform the color information comparison based refinement in a region that includes the thin object in a depth map 840 and perform the median filter based refinement in the remaining region.

Figure 9A:
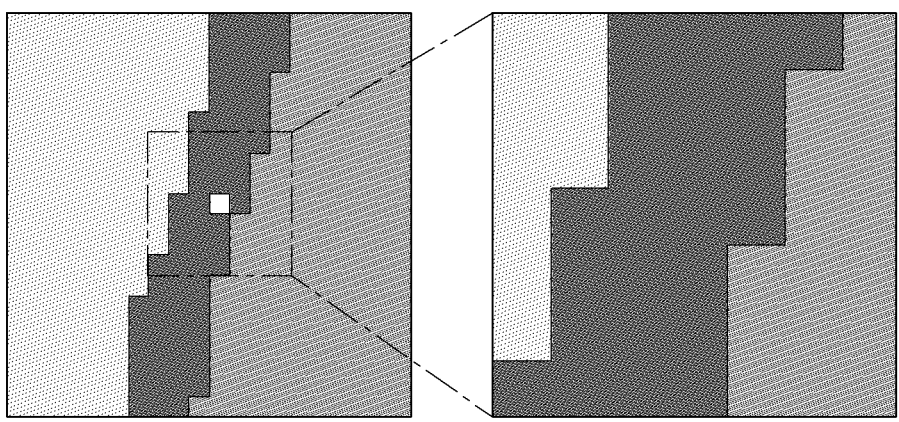
FIG. 9A and FIG. 9B are diagrams illustrating an example depth boundary region of a typical object and a depth boundary region of a thin object according to various embodiments.
Figure 9B:
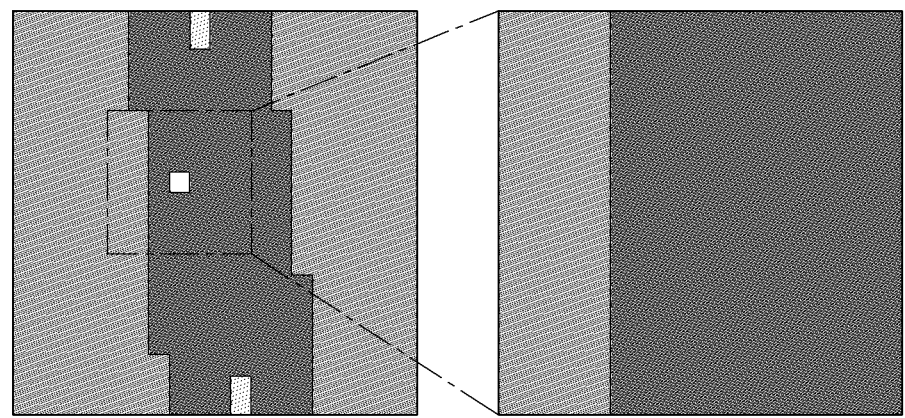

FIG. 9A and FIG. 9B are diagrams illustrating examples of a depth boundary region of a typical object and a depth boundary region of a thin object according to various embodiments.

In an example, FIG. 9A shows the depth boundary region of the typical object, and FIG. 9B shows the depth boundary region of the thin object.

As shown in FIG. 9B, if at least two depth boundaries are adjacent as with the depth boundary region of a thin object, a whole region between the two depth boundaries may be set as the depth boundary region and there is a likelihood of the whole relevant region being refined as the background depth value. Accordingly, when refining a first portion of rounds (e.g., first and second rounds) from among the refinement process of several times (e.g., five times), the depth map refinement may be performed only when the standard deviation of the depth values of pixels excluding the depth boundary region within the window is calculated and is greater than or equal to the threshold value. For example, because a depth of a foreground object and a depth of the background are both present in a surrounding of a typical depth boundary region, the standard deviation of the depths values within a kernel may be great whereas, if most of the foreground object is included in the depth boundary region, the standard deviation may be small. Accordingly, a thin object may be assumed as present if the standard deviation is small, and a side effect which can generate in the median filter based refinement method may be avoided.

Referring back to FIG. 4, the processor 120 may determine the occlusion region (430) from the depth map based on the side effect prediction information (460). In an example, the processor 120 may predict a side effect which can occur according to the object density degree, and identify the occlusion region based on the predicted side effect. For example, the processor 120 may adjust the sizes of the occlusion region and the context region based on the object density degree.

In an example, the processor 120 may set the occlusion region and the context region based on the object density degree, and adjust the size of each region according to the boundary complexity which indicates the object density degree.

The occlusion region may refer, for example, to a region that is obscured by the foreground from the current viewpoint but is to appear at the movement of the viewpoint. For example, the processor 120 may set the occlusion region for each boundary between objects extracted from the depth map.

The context region may be a region adjacent with the occlusion region, and may be used as a hint for filling the occlusion region.

Figure 10:
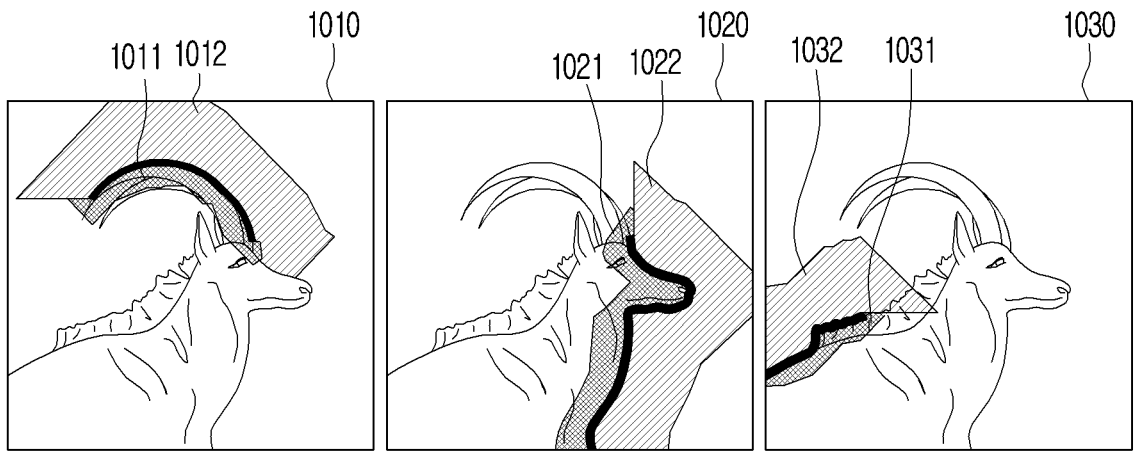
FIG. 10 is a diagram illustrating examples of an occlusion region and a context region according to various embodiments.

FIG. 10 is a diagram illustrating examples of an occlusion region and a context region according to various embodiments.

Referring to FIG. 10, sizes of an occlusion region 1011 and a context region 1012 may be set according to a boundary complexity of a first boundary in a depth map 1010. In addition, sizes of an occlusion region 1021 and a context region 1022 may be set according to a boundary complexity of a second boundary in a depth map 1020. In addition, sizes of an occlusion region 1031 and a context region 1032 may be set according to a boundary complexity of a third boundary in a depth map 1030.

For example, if a plurality of objects is mixed in the boundary region, the boundaries between objects may be concentrated. Based on the above, a likelihood of an unstable result being generated when filling the occlusion region (440) for generating the novel view image (450) may be increased due to the occlusion region being excessively set or unnecessary information being included within the context region.

FIG. 11 is a diagram illustrating an example side effect that generates by an occlusion region being excessively set according to various embodiments.

For example, if a target boundary is in proximity with a neighboring boundary, an occlusion region of the target boundary may intrude an occlusion region of the neighboring boundary, and an undesired result may be derived when generating an image of a different viewpoint. In this case, the above may be resolved by reducing a size of the occlusion region of the target boundary. Accordingly, the side effect may be minimized and/or reduced by adjusting the sizes of the occlusion region and the context region using the boundary complexity which indicates the object density degree.

Figure 12:
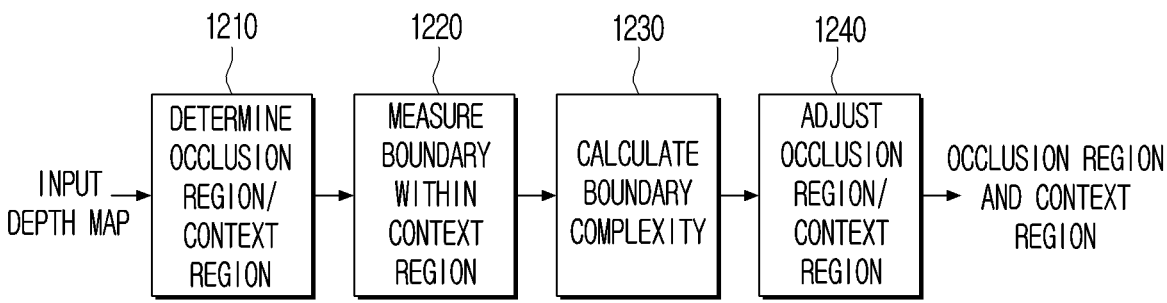
FIG. 12 is a diagram illustrating an example identifying method of an occlusion region according to various embodiments.

FIG. 12 is a diagram illustrating an example identifying method of an occlusion region according to various embodiments.

Referring to FIG. 12, the electronic apparatus 100 may determine the occlusion region and the context region based on the depth map (1210), and identify the boundary within the context region (1220). The electronic apparatus 100 may calculate the boundary complexity of the identified boundary (1230), and adjust the occlusion region and the context region according to the boundary complexity (1240).

In an example, the boundary complexity may be defined by a number of boundaries surrounding the target boundary. For example, the occlusion region within a determined range and a context region corresponding thereto may be initialized based on the target boundary, and a number of boundaries present within an initial context region may be defined as the boundary complexity.

Figure 13A:
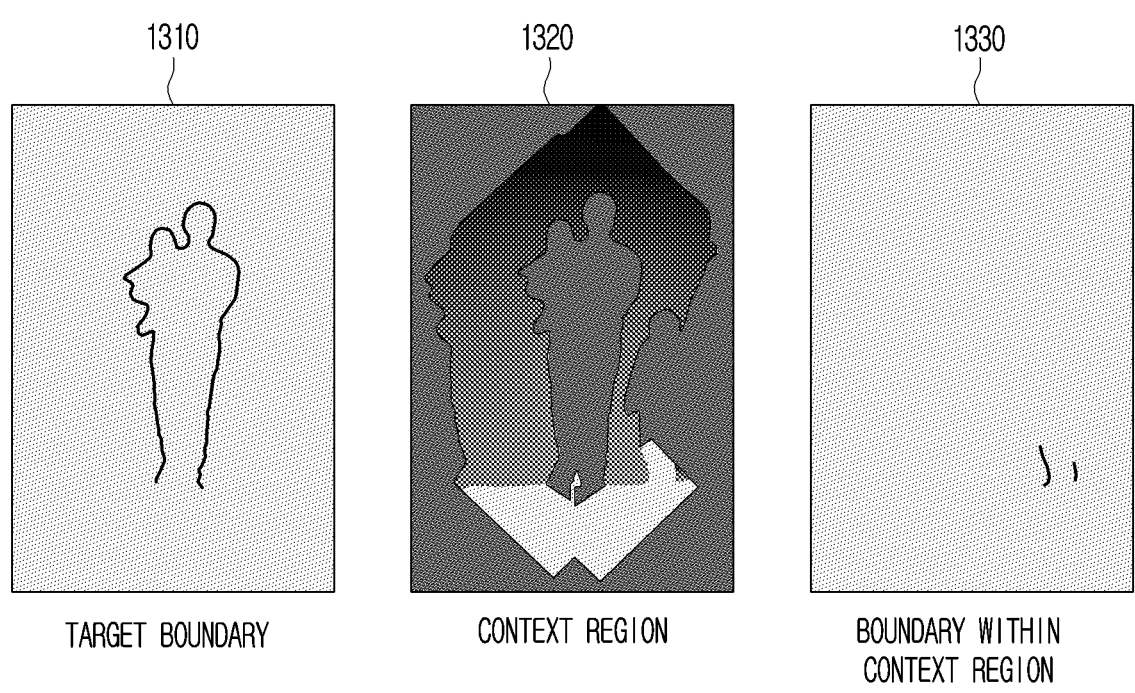
FIG. 13A and FIG. 13B are diagrams illustrating examples of boundary complexity according to various embodiments.
Figure 13B:
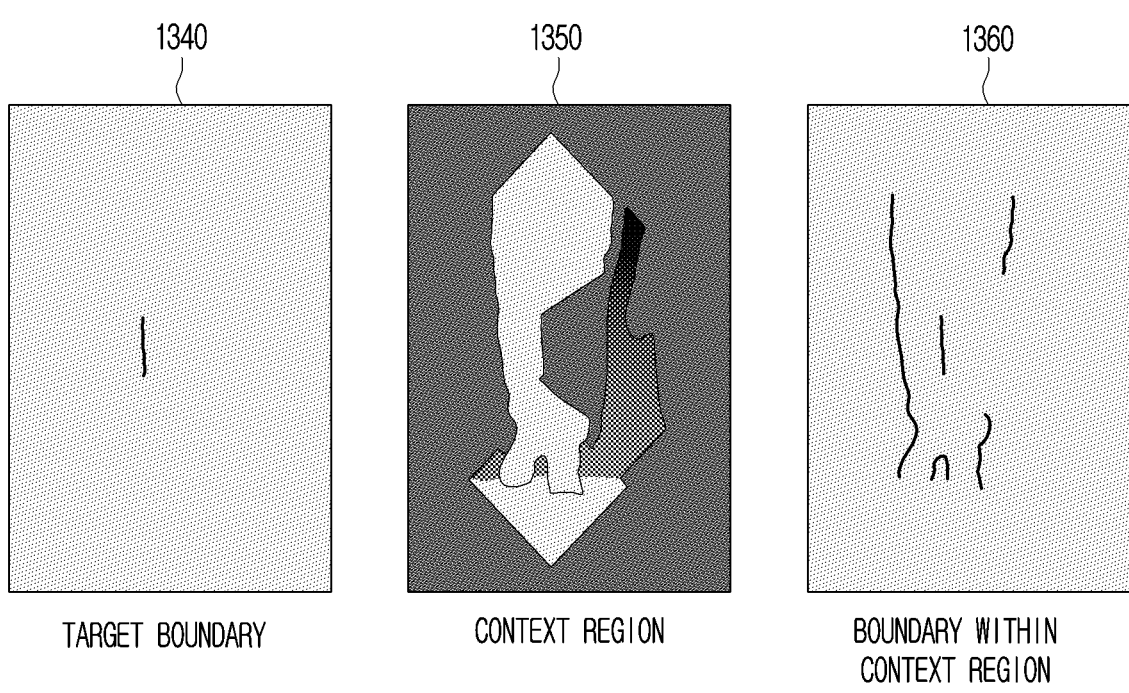

FIG. 13A and FIG. 13B are diagrams illustrating examples of boundary complexity according to various embodiments.

In an example, the electronic apparatus 100 may identify the boundary complexity based on the number of neighboring boundaries included within the context region.

For example, as shown in FIG. 13A, the context region may be identified based on an image 1310 indicating the target boundary (1320), and two boundaries within the context region may be identified based on an image 1330 indicating the boundaries within the context region. Accordingly, the boundary complexity may be identified as 2.

For example, as shown in FIG. 13B, the context region may be identified based on a target boundary 1340, and five boundaries within the context region 1350 may be identified based on an image 1360 indicating the boundaries within the context region. Accordingly, the boundary complexity may be identified as 5.

In an example, if the boundary complexity is greater than or equal to a certain level (e.g., a certain number), widths of the occlusion region and the context region may be reduced such that the occlusion region is not excessively allocated or unnecessary information is not included in the context region. For example, the electronic apparatus 100 may identify a boundary within the context region 1420 based on a context region 1410 as shown in FIG. 14. In the example shown in FIG. 14, if a complexity of the boundary within the context region 1420 is high as 5, at least one from among a size and position of the identified occlusion region 1430 may be adjusted, and the adjusted occlusion region 1440 may be identified.

However, the number of the boundary complexity and the adjustment for the position/size of the occlusion region shown in FIG. 13A, FIG. 13B, and FIG. 14 are merely an example, and the above is not limited thereto.

According to various embodiments of the disclosure as described above, the novel view image may be generated by reducing the area ratio of the thin object compared to the whole image and/or the viewpoint movement range in proportion to the boundary complexity based on the estimated depth map. In addition, the novel view image may be generated by differently applying the depth map refinement method of the thin object region and the remaining region. Accordingly, the side effect which may occur based on the thin object and/or the object density may be minimized and/or reduced.

In addition, the methods according to various embodiments of the disclosure described above may be implemented with only a software upgrade, or a hardware upgrade of a display apparatus of the related art and the electronic apparatus of the related art.

In addition, various embodiments of the disclosure described above may be performed through an embedded server provided in the electronic apparatus, or an external server of the electronic apparatus.

Meanwhile, according to an embodiment of the disclosure, the various embodiments described above may be implemented with software including instructions stored in a machine-readable storage media (e.g., computer). The machine may call an instruction stored in the storage medium, and as a device operable according to the called instruction, may include an electronic apparatus (e.g., electronic apparatus (A)) according to the above-mentioned embodiments. Based on a command being executed by the processor, the processor may directly or using other elements under the control of the processor perform a function relevant to the command. The command may include a code generated by a compiler or executed by an interpreter. The machine-readable storage medium may be provided in the form of a non-transitory storage medium. Herein, 'non-transitory' merely refers, for example, to the storage medium being tangible and not including a signal, and the term does not differentiate data being semi-permanently stored or being temporarily stored in the storage medium.

In addition, according to an embodiment of the disclosure, a method according to the various embodiments described above may be provided included a computer program product. The computer program product may be exchanged between a seller and a purchaser as a commodity. The computer program product may be distributed in the form of the machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

In addition, each of the elements (e.g., a module or a program) according to the various embodiments described above may be formed as a single entity or a plurality of entities, and some sub-elements of the above-mentioned sub-elements may be omitted, or other sub-elements may be further included in the various embodiments. Alternatively or additionally, some elements (e.g., modules or programs) may be integrated into one entity to perform the same or similar functions performed by the respective elements prior to integration. Operations performed by a module, a program, or another element, in accordance with the various embodiments, may be executed sequentially, in a parallel, repetitively, or in a heuristic manner, or at least some operations may be executed in a different order, omitted or a different operation may be added.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic apparatus, comprising:
a memory storing at least one instruction; and
at least one processor, comprising processing circuitry, individually and/or collectively, configured to:
identify a foreground region and a background region included in an input image based on a depth map corresponding to the input image, identify side effect prediction information based on at least one from among whether an object of less than or equal to a specified thickness is included in the input image or whether an object including an object density degree greater than or equal to a threshold value is included in the input image, and generate a novel view image by converting a viewpoint based on the foreground region and by controlling a viewpoint movement path based on the identified side effect prediction information, wherein the viewpoint movement path is reduced based on the object of less than or equal to the specified thickness being identified as being included in the input image or the object including the object density degree greater than or equal to the threshold value being identified as being included in the input image.

2. The electronic apparatus of claim 1, wherein the viewpoint movement path is reduced to less than a threshold range based on the object of less than or equal to the specified thickness being identified as being included in the input image or the object including the object density degree greater than or equal to the threshold value being identified as being included in the input image.

3. The electronic apparatus of claim 1, wherein
at least one processor, individually and/or collectively, is configured to:
control, based on the object of less than or equal to the specified thickness being identified as being included in the input image based on the depth map, reduction of the viewpoint movement path in proportion to an area ratio which the object of less than or equal to the specified thickness occupies in the input image.

4. The electronic apparatus of claim 1, wherein
at least one processor, individually and/or collectively, is configured to:
obtain a depth map applied with an opening operation by applying the opening operation to the depth map, and
identify a region including the object of less than or equal to the specified thickness based on difference information between the depth map and the depth map applied with the opening operation.

5. The electronic apparatus of claim 1, wherein
at least one processor, individually and/or collectively, is configured to:
calculate a standard deviation of depth values of pixels excluding a depth boundary region within a specified window by applying the specified window to the depth map, and
perform a depth map refinement based on the calculated standard deviation being greater than or equal to a threshold value.

6. The electronic apparatus of claim 1, wherein
at least one processor, individually and/or collectively, is configured to:
generate, based on the object density degree being identified as greater than or equal to the threshold value based on the depth map, the novel view image by controlling reduction of the viewpoint movement path to less than a threshold range.

7. The electronic apparatus of claim 1, wherein
at least one processor, individually and/or collectively, is configured to:
adjust an occlusion region and a context region based on a boundary complexity indicating the object density degree, wherein the occlusion region includes a region not exposed by the foreground region from a current viewpoint and exposed at movement of the viewpoint, and wherein the context region is a region adjacent to the occlusion region.

8. The electronic apparatus of claim 7, wherein at least one processor, individually and/or collectively, is configured to:

identify the boundary complexity based on a number of neighboring boundaries included within the context region, and reduce a width of at least one from among the occlusion region and the context region based on the number of neighboring boundaries being greater than or equal to a threshold number.

9. The electronic apparatus of claim 1, wherein at least one processor, individually and/or collectively, is configured to:

refine the depth map by substituting a depth value of a region corresponding to the object of less than or equal to the specified thickness with a depth value of a surrounding pixel having the most similar color information with a target pixel.

10. The electronic apparatus of claim 1, wherein at least one processor, individually and/or collectively, is configured to:

refine the depth map by substituting a depth value of other than the region corresponding to the object of less than or equal to the specified thickness with a median value of depth values of pixels within a specified window.

11. A method of controlling an electronic apparatus, the method comprising:

identifying a foreground region and a background region included in an input image based on a depth map corresponding to the input image; and generating a novel view image by converting a viewpoint based on the foreground region, wherein the generating a novel view image comprises:

identifying side effect prediction information based on at least one from among whether an object of less than or equal to a specified thickness is included in the input image or whether an object including an object density degree greater than or equal to a threshold value is included in the input image; and generating the novel view image by controlling a viewpoint movement path based on the identified side effect prediction information, wherein the viewpoint movement path is reduced based on the object of less than or equal to the specified thickness being identified as being included in the input image or the object including the object density degree greater than or equal to the threshold value being identified as being included in the input image.

12. The method of claim 11, wherein the viewpoint movement path is reduced to less than a threshold range based on the object of less than or equal to the specified thickness being identified as being included in the input image or the object including the object density degree greater than or equal to the threshold value being identified as being included in the input image.

13. The method of claim 11, wherein the generating the novel view image comprises:

controlling, based on the object of less than or equal to the specified thickness being identified as being included in the input image based on the depth map, reduction of the viewpoint movement path in proportion to an area ratio which the object of less than or equal to the specified thickness occupies in the input image.

14. The method of claim 11, wherein the generating the novel view image comprises:

obtaining a depth map applied with an opening operation by applying the opening operation to the depth map; and identifying a region included with the object of less than or equal to the specified thickness based on difference information between the depth map and the depth map applied with the opening operation.

15. The method of claim 11, further comprises:

calculating a standard deviation of depth values of pixels excluding a depth boundary region within a specified window by applying the specified window to the depth map, and performing a depth map refinement based on the calculated standard deviation being greater than or equal to a threshold value.

16. A non-transitory computer-readable storage medium storing computer commands which when executed individually and/or collectively by at least one processor of an electronic apparatus, cause the electronic apparatus to perform operations comprising:

identifying a foreground region and a background region included in an input image based on a depth map corresponding to the input image; and generating a novel view image by converting a viewpoint based on the foreground region, wherein the generating a novel view image comprises:

identifying side effect prediction information based on at least one from among whether an object of less than or equal to a specified thickness is included in the input image or whether an object including an object density degree greater than or equal to a threshold value is included in the input image; and generating the novel view image by controlling a viewpoint movement path based on the identified side effect prediction information, wherein the viewpoint movement path is reduced based on the object of less than or equal to the specified thickness being identified as being included in the input image or the object including the object density degree greater than or equal to the threshold value being identified as being included in the input image.

17. The non-transitory computer-readable storage medium of claim 16, wherein the viewpoint movement path is reduced to less than a threshold range based on the object of less than or equal to the specified thickness being identified as being included in the input image or the object including the object density degree greater than or equal to the threshold value being identified as being included in the input image.

18. The non-transitory computer-readable storage medium of claim 16, wherein the generating the novel view image comprises:

controlling, based on the object of less than or equal to the specified thickness being identified as being included in the input image based on the depth map, reduction of the viewpoint movement path in proportion to an area ratio which the object of less than or equal to the specified thickness occupies in the input image.

19. The non-transitory computer-readable storage medium of claim 16, wherein the generating the novel view image comprises obtaining a depth map applied with an opening operation by applying the opening operation to the depth map; and identifying a region included with the object of less than or equal to the specified thickness based on difference information between the depth map and the depth map applied with the opening operation.

20. The non-transitory computer-readable storage medium of claim 16, wherein the operations further comprises:

calculating a standard deviation of depth values of pixels excluding a depth boundary region within a specified window by applying the specified window to the depth map, and performing a depth map refinement based on the calculated standard deviation being greater than or equal to a threshold value.

\* \* \* \* \*